US009954229B2

(12) United States Patent
Xiao et al.

(10) Patent No.: US 9,954,229 B2
(45) Date of Patent: Apr. 24, 2018

(54) ELECTROLYTE FOR STABLE CYCLING OF HIGH-ENERGY LITHIUM SULFUR REDOX FLOW BATTERIES

(71) Applicant: Battelle Memorial Institute, Richland, WA (US)

(72) Inventors: Jie Xiao, Richland, WA (US); Jun Liu, Richland, WA (US); Huilin Pan, Richland, WA (US); Wesley A. Henderson, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 25 days.

(21) Appl. No.: 14/530,442

(22) Filed: Oct. 31, 2014

(65) Prior Publication Data
US 2016/0126580 A1 May 5, 2016

(51) Int. Cl.
*H01M 8/18* (2006.01)
*H01M 4/66* (2006.01)
*H01M 8/20* (2006.01)
*H01M 12/08* (2006.01)

(52) U.S. Cl.
CPC .............. *H01M 4/663* (2013.01); *H01M 8/20* (2013.01); *H01M 12/08* (2013.01); *Y02E 60/128* (2013.01)

(58) Field of Classification Search
CPC .............................................. H01M 8/18–8/20
See application file for complete search history.

(56) References Cited

U.S. PATENT DOCUMENTS

| 4,071,665 | A | 1/1978 | Garth |
| 6,218,054 | B1 | 4/2001 | Webber |
| 2002/0102466 | A1* | 8/2002 | Hwang ............... H01M 4/13 429/326 |
| 2010/0021815 | A1 | 1/2010 | Oh et al. |
| 2011/0200848 | A1* | 8/2011 | Chiang ............... B60L 11/1875 429/4 |
| 2012/0135278 | A1 | 5/2012 | Yoshie et al. |
| 2013/0022852 | A1* | 1/2013 | Chang ............... H01M 8/188 429/105 |
| 2013/0122334 | A1* | 5/2013 | Visco ............... H01M 4/38 429/72 |
| 2013/0224538 | A1 | 8/2013 | Jansen et al. |
| 2013/0224550 | A1* | 8/2013 | Bugga ............... H01M 8/188 429/105 |

(Continued)

OTHER PUBLICATIONS

International Search Report and Written Opinion issued in application No. PCT/US2015/058131 dated Jan. 20, 2016, 7 pages.
Brummer, et al., "Technical Report: Low temperature lithium/sulfur secondary battery. Annual progress report, Dec. 1, 1974-Dec. 1, 1975," *Energy Research and Development Administration, Division of Electric Energy Systems*, 68 pages, Apr. 1976.
International Search Report and Written Opinion issued in international application PCT/US2015/038627 dated Oct. 21, 2015, 7 pages.

(Continued)

*Primary Examiner* — Jonathan Crepeau
*Assistant Examiner* — Jacob Buchanan
(74) *Attorney, Agent, or Firm* — Klarquist Sparkman, LLP

(57) ABSTRACT

A device comprising:
a lithium sulfur redox flow battery comprising an electrolyte composition comprising:
(i) a dissolved $Li_2S_x$ electroactive salt, wherein $x \geq 4$;
(ii) a solvent selected from dimethyl sulfoxide, tetrahydrofuran, or a mixture thereof; and
(iii) a supporting salt at a concentration of at least 2 M, as measured by moles of supporting salt divided by the volume of the solvent without considering the volume change of the electrolyte after dissolving the supporting salt.

17 Claims, 8 Drawing Sheets

(56) References Cited

U.S. PATENT DOCUMENTS

| | | | |
|---|---|---|---|
| 2013/0266874 A1 | 10/2013 | Matsubara et al. | |
| 2014/0302370 A1 | 10/2014 | Woodford | |
| 2014/0342249 A1* | 11/2014 | He | H01M 10/056 429/403 |
| 2014/0356736 A1* | 12/2014 | Choi | H01M 4/62 429/405 |
| 2014/0363746 A1* | 12/2014 | He | H01M 10/052 429/406 |
| 2015/0024121 A1* | 1/2015 | He | H01M 10/0566 427/121 |
| 2015/0060290 A1 | 3/2015 | Xu | |
| 2015/0111097 A1 | 4/2015 | Park et al. | |

OTHER PUBLICATIONS

Matsumoto et al., "Performance Improvement of Li Ion Battery with Non-Flammable TMP Mixed Electrolyte by Optimization of Lithium Salt Concentration and SEI Performation Technique on Graphite Anode," *J. Electrochem. Soc.*, 161(5): A831-A834, Apr. 2014.

Matsumoto et al., "SEI Pre-coated Graphite Anode in Lithium Ion Battery with EMITFSI Ionic Liquid Eletrolyte," *The Electrochemical Society*, 215th ECS Meeting, Abstract #179, downloaded May 4, 2015.

Nie et al., "Lithium Ion Battery Graphite Solid Electrolyte Interphase Revealed by Microscopy and Spectroscopy," *J. Phys. Chem. C.* 117(3): 1257-1267, Jan. 2013.

Schneider et al., "On the Electrode Potentials in Lithium-Sulfur Batteries and Their Solvent-Dependence," *Journal of the Electrochemical Society*, 161(9): A1399-A1406, Jun. 20, 2014.

Sodeyama et al., "Sacrificial Anion Reduction Mechanism for Electrochemical Stability Improvement in Highly Concentrated Li-Salt Electrolyte," *Journal of Physical Chemistry*, 118(26): 14091-14097, Jun. 25, 2014.

U.S. Appl. No. 14/529,840, filed Oct. 31, 2014.

U.S. Appl. No. 14/530,562, filed Oct. 31, 2014.

Verma et al., "A review of the features and analyses of the solid electrolyte interphase in Li-ion batteries." *Electrochemica Acta*, 55(22): 6332-6341, Sep. 2010.

Xu et al., "Lithium Bis(oxalato)borate Stabilizes Graphite Anode in Propylene Carbonate," *Electrochemical and Solid-State Letters*, 5(11): A259-A262, Sep. 2002.

Yamada et al., "A superconcentrated ether electrolyte for fast-charging Li-ion batteries," *Chem. Commun.*, No. 49, pp. 11194-11196.

Yamada et al., "General Observation of Lithium Intercalation into Graphite in Ethylene-Carbonate-Free Superconcentrated Electrolytes," 6(14): 10892-10899, Mar. 26, 2014.

Yamada et al., "Unusual Stability of Acetonitrile-Based Superconcentrated Electrolytes for Fast-Changing Lithium-Ion Batteries," *J. Am. Chem. Soc.*, 136(13): 5039-5046, Mar. 2014.

Zhang et al., "Liquid electrolyte lithium/sulfur battery: Fundamental Chemistry, problems, and solutions," *Journal of Power Sources*, No. 231, pp. 153-162, Dec. 27, 2012.

Huang et al., "Manipulating surface reactions in lithium-sulphur batteries using hybrid anode structures," Nature communications, 5, 7 pp. (Jan. 2014).

Office action from U.S. Patent and Trademark Office for U.S. Appl. No. 14/529,840, dated Dec. 29, 2016.

Office action from U.S. Patent and Trademark Office for U.S. Appl. No. 14/529,840, dated Oct. 19, 2017.

\* cited by examiner

FIG. 8
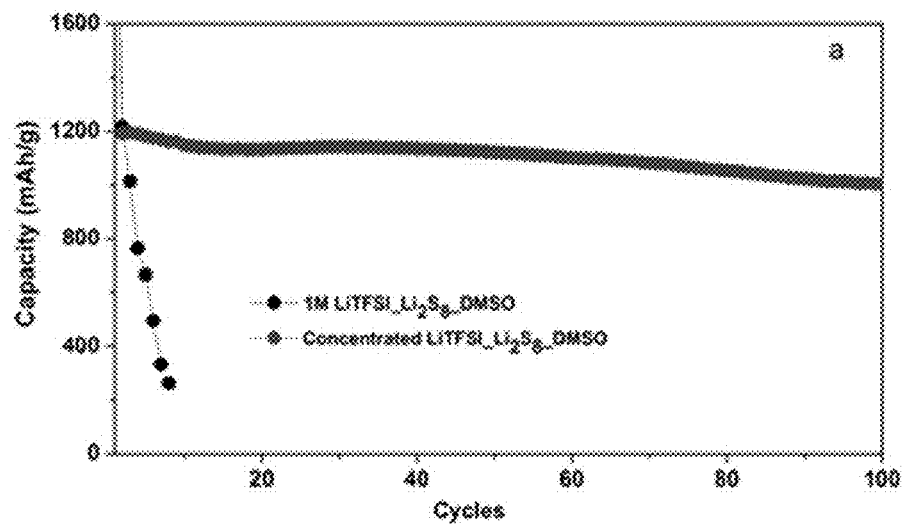
FIG. 8A
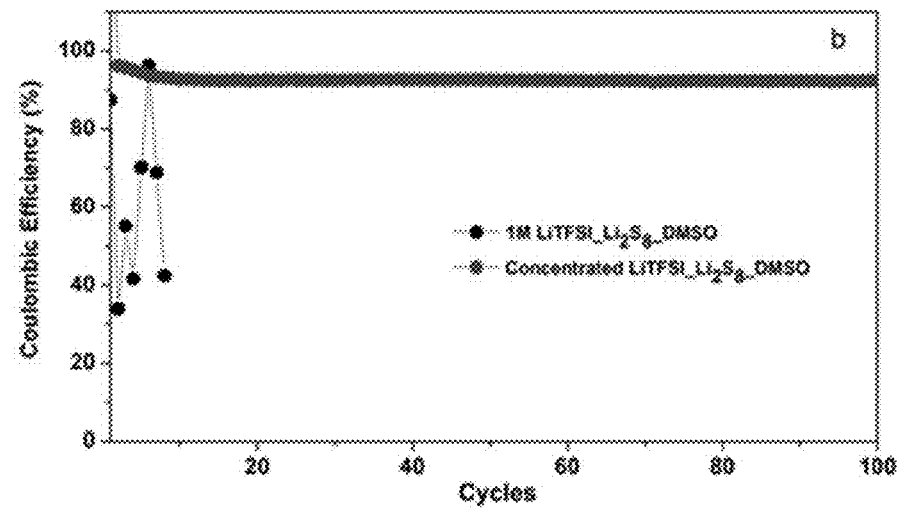
FIG. 8B

ELECTROLYTE FOR STABLE CYCLING OF HIGH-ENERGY LITHIUM SULFUR REDOX FLOW BATTERIES

STATEMENT AS TO RIGHTS TO INVENTIONS MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

BACKGROUND

High energy non-aqueous lithium sulfur (Li—S) redox flow batteries are of interest, particularly for stationary applications. However, the presence of insoluble short-chain polysulfides largely sacrifices the theoretically high energy opportunity due to deposition of $Li_2S_2/Li_2S$ onto the current collectors (for example, graphite felt). In addition, the unstable interface between the conventional electrolyte and the lithium metal anode surface also limits the long-term cycling performance of the redox flow batteries.

SUMMARY

Disclosed herein is a device comprising:
  a lithium sulfur redox flow battery comprising an electrolyte composition comprising:
    (i) a dissolved $Li_2S_x$ electroactive salt, wherein $x \geq 4$;
    (ii) a solvent selected from dimethyl sulfoxide, tetrahydrofuran, or a mixture thereof; and
    (iii) a supporting salt at a concentration of at least 2 M, as measured by moles of supporting salt divided by the volume of the solvent without considering the volume change of the electrolyte after dissolving the supporting salt.

Also disclosed herein is an energy storage system comprising:
  a lithium sulfur redox flow battery comprising an electrolyte composition comprising:
    (i) a dissolved $Li_2S_x$ electroactive salt, wherein $x \geq 4$;
    (ii) a solvent selected from dimethyl sulfoxide, tetrahydrofuran, or a mixture thereof; and
    (iii) a supporting salt at a concentration of at least 2 M, as measured by moles of supporting salt divided by the volume of the solvent without considering the volume change of the electrolyte after dissolving the supporting salt; and
  a source of the electrolyte composition fluidly coupled to the lithium sulfur redox flow battery.

The foregoing will become more apparent from the following detailed description, which proceeds with reference to the accompanying figures.

BRIEF DESCRIPTION OF THE DRAWINGS

FIGS. 8a and 8b are graphs showing (a) the cycling performance and (b) the Coulombic efficiency of Li—S batteries in 1M and concentrated (3 M) electrolytes comprised of LiTFSI in DMSO-based electrolyte, respectively. (Note: the S cathode used here was dissolved into DMSO electrolyte in the form of $Li_2S_x$).

DETAILED DESCRIPTION

Figure 1:
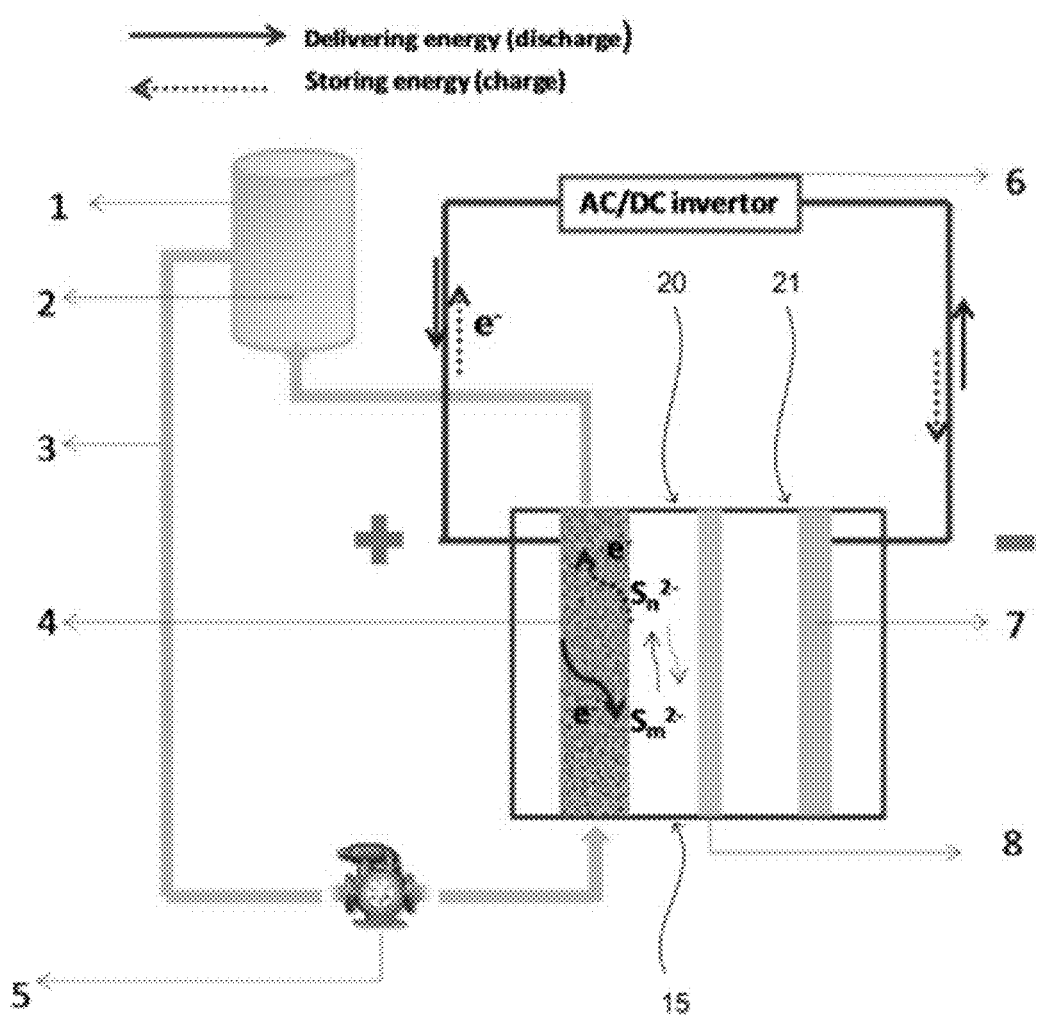
FIG. 1 is a schematic representing one embodiment of an energy storage system disclosed herein.

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought as known by those persons of ordinary skill in the art or limits of detection under standard test conditions/methods, as known to those persons of ordinary skill in the art. When directly and explicitly distinguishing embodiments from discussed prior art, the embodiment numbers are not approximates unless the word "about" is recited.

To facilitate review of the various embodiments of the disclosure, the following explanations of specific terms are provided:

Cell: As used herein, a cell refers to an electrochemical device used for generating a voltage or current from a chemical reaction, or the reverse in which a chemical reaction is induced by a current. Examples include voltaic cells, electrolytic cells, redox flow cells, and fuel cells, among others. A battery includes one or more cells. The terms "cell" and "battery" are used interchangeably only when referring to a battery containing a single cell.

Half-cell: As used herein, a half-cell is an electrochemical cell including a lithium metal negative electrode, another working electrode as the positive electrode, a separator, and an electrolyte.

The volume energy density of a redox flow battery can be calculated from the following equation:

$$E = n \cdot 26.8 \cdot M \cdot OCV \text{ (Wh/L)} \qquad \text{Eq}(1)$$

where n is the electron transfer number, M is the concentration of catholyte; OCV is the open circuit voltage of the cell.

From Eq (1), the higher concentration the higher volumetric energy density in a redox flow battery, thus it is critical to increase the concentration of catholyte/anolyte to improve the volumetric energy density of a given system.

In the case of Li—S redox flow batteries, the higher the solubility of $Li_2S_x$ the higher energy density would be achieved. Furthermore, high solubility is needed not only for starting species like soluble $Li_2S_8$, it is also very critical for the discharge product $Li_2S_2$ which is nearly insoluble. Otherwise, the insoluble $Li_2S_2$ easily blocks the porous current collector (graphite felt) and terminates the cell operation.

Thus, disclosed herein are energy storage systems that include a non-aqueous lithium sulfur (Li—S) redox flow battery device that includes a novel electrolyte composition that increases the solubility of short-chain polysulfides such as $Li_2S_2$ and enable the stable cycling of lithium metal anodes. An example of one embodiment of an energy storage system is shown in FIG. 1. The redox flow battery device includes a catholyte solution 2 that is in contact with a current collector 4. The redox flow battery also includes an anode electrode 7. The catholyte solution 2, the current collector 4 and the anode electrode 7 may be arranged in a redox flow battery compartment 15.

The catholyte solution includes particular combinations of a solvent and a high concentration of at least one supporting salt that increase the solubility of short-chain polysulfides such as $Li_2S_2$ and enable the stable cycling of lithium metal anodes.

Figure 2:
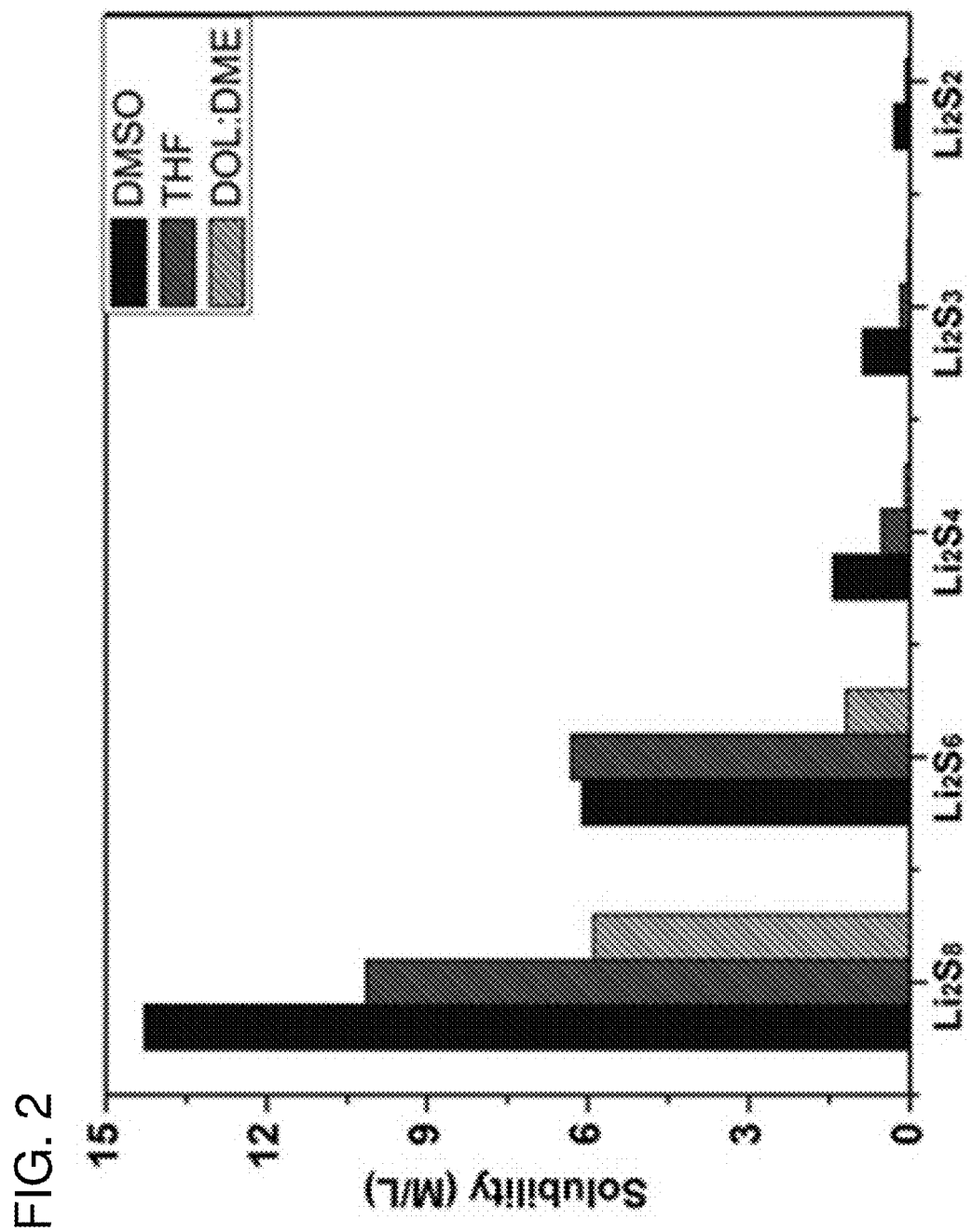
FIG. 2 is a graph depicting the solubility of $Li_2S_x$ in pure dimethyl sulfoxide (DMSO), tetrahydrofuran (THF) and 1,3-dioxolane (DOL) and dimethoxyethane (DME) co-solvent (DOL:DME). Solubility for $Li_2S_x$ is calculated based on elemental sulfur S.

Dimethyl sulfoxide (DMSO) is a strong high polar solvent, which shows higher solubility for high order lithium polysulfide $Li_2S_x$ (x≥6). However, for low order lithium polysulfide (x≤4), the solubility in pure DMSO is quite low (FIG. 2.). In addition, although the DMSO-based solvent has been identified to improve polysulfide solubility, the compatibility of Li anode with DMSO-based electrolyte is a concern in a Li—S redox flow battery. Usually lithium metal cannot be cycled at all in DMSO-based electrolyte due to intense side reactions between DMSO and lithium. It has now surprisingly been found that a combination of a specific solvent, DMSO and/or THF, and a high concentration of at least one supporting salt synergistically cooperate to provide both increased solubility of low order $Li_2S_x$ electroactive salts and enable reversible cycling of a Li metal anode.

In particular, the catholyte solution includes a solvent selected from DMSO, THF, or a mixture of DMSO and THF. In certain embodiments, the catholyte solution consists essentially of, or consists of, DMSO. In certain embodiments, the catholyte solution consists essentially of, or consists of, THF. In certain embodiments, the catholyte solution consists essentially of, or consists of, a mixture of DMSO and THF.

The supporting salt in the catholyte solution may be selected from lithium trifluoromethanesulfonate ($CF_3SO_3Li$, LiTf), lithium bis(trifluoromethanesulphonyl)imide ($LiN(SO_2CF_3)_2$, LiTFSI), $LiCF_2CO_2$, $LiNO_3$, or a mixture thereof. In general, the concentration of at least one of the supporting salts should be at least 2M, particularly greater than 2 M, more particularly at least 3 M, and most particularly at least 4 M, as measured by moles of supporting salt divided by the volume of the solvent without considering the volume change of the electrolyte after dissolving the supporting salt. In other words, x M means x M supporting salt/1 L solvent. When the supporting salt concentration is greater than 5 M, the utility of sulfur becomes low due to increased viscosity.

The electroactive salt in the catholyte solution may be selected from any $Li_2S_x$ salt (where x≥4). In certain embodiments, the electroactive salt is $Li_2S_8$.

Listed below are illustrative embodiments of catholyte solutions (the $Li_2S_8$ concentration is based on elemental sulfur):

1) 0.5-4 M $Li_2S_8$ dissolved in DMSO solvent with 2M-4 M LiTFSI as supporting salt.
2) 0.5-4 M $Li_2S_8$ dissolved in DMSO solvent with 2M-4 M LiTFSI and 0-0.5 M $LiNO_3$ as supporting salt.
3) 0.5-6 M $Li_2S_8$ dissolved in DMSO solvent with 2M-4 M LiTFSI and 0.001-1 M LiTf as supporting salt.
4) 0.5-6 M $Li_2S_8$ dissolved in DMSO solvent with 2M-4 M LiTFSI, 0.001-1 M LiTf and 0-0.5 M $LiNO_3$ as supporting salt.

The anode electrode may be a lithium metal (with or without a passivation layer), graphite, tin or a tin alloy with another metal, or porous silicon.

The current collector may be a porous carbon electrode such as graphite felt, or where the carbon is a carbon nanofiber, a carbon nanotube, or graphene; a porous carbon electrode modified with metal and/or metal oxide, such as Pt, Au, $MnO_2$, or ITO; or a porous carbon electrode modified by a functional group such as —COOH.

In certain embodiments of the system shown in FIG. 1, the redox flow battery 15 includes a first half cell part 20 and a second half cell part 21. In certain embodiments, the first cell part 20 is contiguous with the second cell part 21. The first cell part 20 includes the catholyte solution 2 and the current collector 4. The second cell part 21 includes the same catholyte solution 2 for $Li_2S_x$ free common electrolyte that is in contact with the anode electrode 7. A separator 8 is located between the first half cell 20 and the second half cell 21.

In certain embodiments, there is no separator. In the separator-less embodiment there are not first and second half-part cells.

Also disclosed are energy storage systems that include a catholyte solution source 1 (e.g., a tank) in fluid communication with the redox flow battery compartment 15. A flow conduit 3 fluidly couples the source 1 to the compartment 15. For example, the first half cell part 20 may include ports connected to the flow conduit 3. A pump 5, or some other fluid motive device, is in fluid communication with the flow conduit 3. The system may also include a flow controller for electrolyte maintenance. The conduit and flow controller can be configured to permit or restrict circulation of electrolyte solution from the first half cell part 20 to the second half cell part 21, and vice versa. The first half cell part 20 and the second half cell part 21 are configured to be flow cells.

The system also includes an external electrical load 6 coupled to the current collector 4 and the anode 7.

In certain embodiments, the catholyte solution and the anolyte solution are substantially the same solution and/or are sourced from a common solution. In certain embodiments with an ion selective membrane separator, the anolyte may include a salt such as LiTFSI or LiFSI dissolved in an ether solvent such 1,2-dimethoxyethane (DME), or an alkyl carbonate solvent such as propylene carbonate (PC), ethylene carbonate (EC), or dimethyl carbonate (DMC).

The redox flow battery compartment can be configured as a flow cell in fluid communication with a source of the catholyte solution. In certain embodiments, the first half cell 20 can be configured as a flow cell in fluid communication with catholyte source 1.

In certain embodiments, the separator 8 may be a porous membrane material. Examples of the membrane can include, but are not limited to, ion-exchange membranes, polymer membranes, and solid-state membranes the comprise polymer(s), sulfonated tetrafluoroethylene based fluoropolymer-copolymer(s), and ceramics. Examples of a porous separator include, but are not limited to, nano- and micro-porous separators that comprise polymer(s), ceramic(s), glass(es) or other materials. Non-limiting examples of suitable separator materials include, NAFION-type ion exchange membranes (sulfonated tetrafluoroethylene-based fluoropolymer-copolymers), other porous polymeric materials such as, for example, sulfonated poly(ether ether ketones), polysulfones, polyethylene, polypropylene, ethylene-propylene copolymers, polyimides, polyvinyldifluorides, and the like, which can be in the form of membranes, matrix-supported gels, sheets, films, or panels. Other suitable materials include porous ceramics, porous insulated metals, cation-conducting glasses, and zeolites. Alternatively, the separator can be an interface between immiscible liquids. In such case, a porous film, panel, or mesh might be included to aid in maintaining separation between the liquids (e.g., as a physical support or guide to aid in maintaining laminar flow at the interface).

The redox flow battery device has a prior-to-charge state in which the catholyte comprises the components described above. This means that the catholyte solution includes $S_8^{2-}$ and optionally at least one species selected from $S_8^0$, $S_6^{2-}$, $S_4^{2-}$, $S_3^{*-}$.

During discharging of the battery, the current collector and the anode electrode are placed in a circuit (e.g., with an external load such as a power grid), while simultaneously pumping the catholyte over the cathode current collector. $S_8^{2-}$ and/or $S_m^{2-}$ species are reduced to $S_3^{*-}$, $S_2^{2-}$ and/or $S^{2-}$ and stored in the catholyte. Reduced catholyte flows through the cathode current collector, and back to the tank 1. During discharging the following reactions may be occurring:

$$4S_8^{2-} \leftrightarrow S_6^{2-} + S_8$$

$$S_8 + 2e^- \rightarrow S_8^{2-}$$

$$S_6^{2-} \leftrightarrow S_3^{*-}$$

$$S_3^{*-} + e^- \rightarrow S_3^{2-}$$

$$8S_3^{2-} \leftrightarrow S_2^{2-} + S_8$$

$$4S_3^{2-} \leftrightarrow 4S^{2-} + S_8$$

During charging of the battery, an electric potential is applied to the cathode and anode current collectors, with the stored reduced catholyte being pumped back over the cathode current collector again to be oxidized. During discharging the following reactions may be occurring:

$$4S_2^{2-} - 8e^- \rightarrow S_8^0,$$

$$S_8^0 + 4S^{2-} \rightarrow 4S_3^{2-}$$

$$S_3^{2-} - e^- \rightarrow S_3^{*-} \leftrightarrow S_6^{2}$$

$$S_3^{*-} \leftrightarrow S_6^{2}$$

$$4S_6^{2-} + S_8 \leftrightarrow 4S_8$$

$$S_8^{2-} - 2e^- \rightarrow S_8$$

After charging and discharging, the catholyte again comprises the components described above.

The redox active species may be:

$$S_8 + 2e^- \rightarrow S_8^{2-} \quad (1)$$

$$S_3^{*-} + e^- \rightarrow S_3^{2-} \quad (2)$$

In which, reaction (1) is dominate reaction at higher voltage; reaction (2) is the dominate reaction at a lower voltage.

Certain metal-ligand coordination also possibly may be produced during charge/discharge process, such as $(DMSO)_n(LiTFSI)_m(Li_2S_x)_1$ (m, n, 1≥0).

Compared with aqueous redox flow cells, the volume energy density of the presently disclosed systems is much higher due to the increased voltage and capacity. For example, in certain embodiments, the non-aqueous redox flow batteries may have volume energy density values that are greater than 50 Wh/L, or greater than 100 Wh/L. In addition, sulfur is very cheap thus reducing the cost.

EXAMPLES

Figure 3:
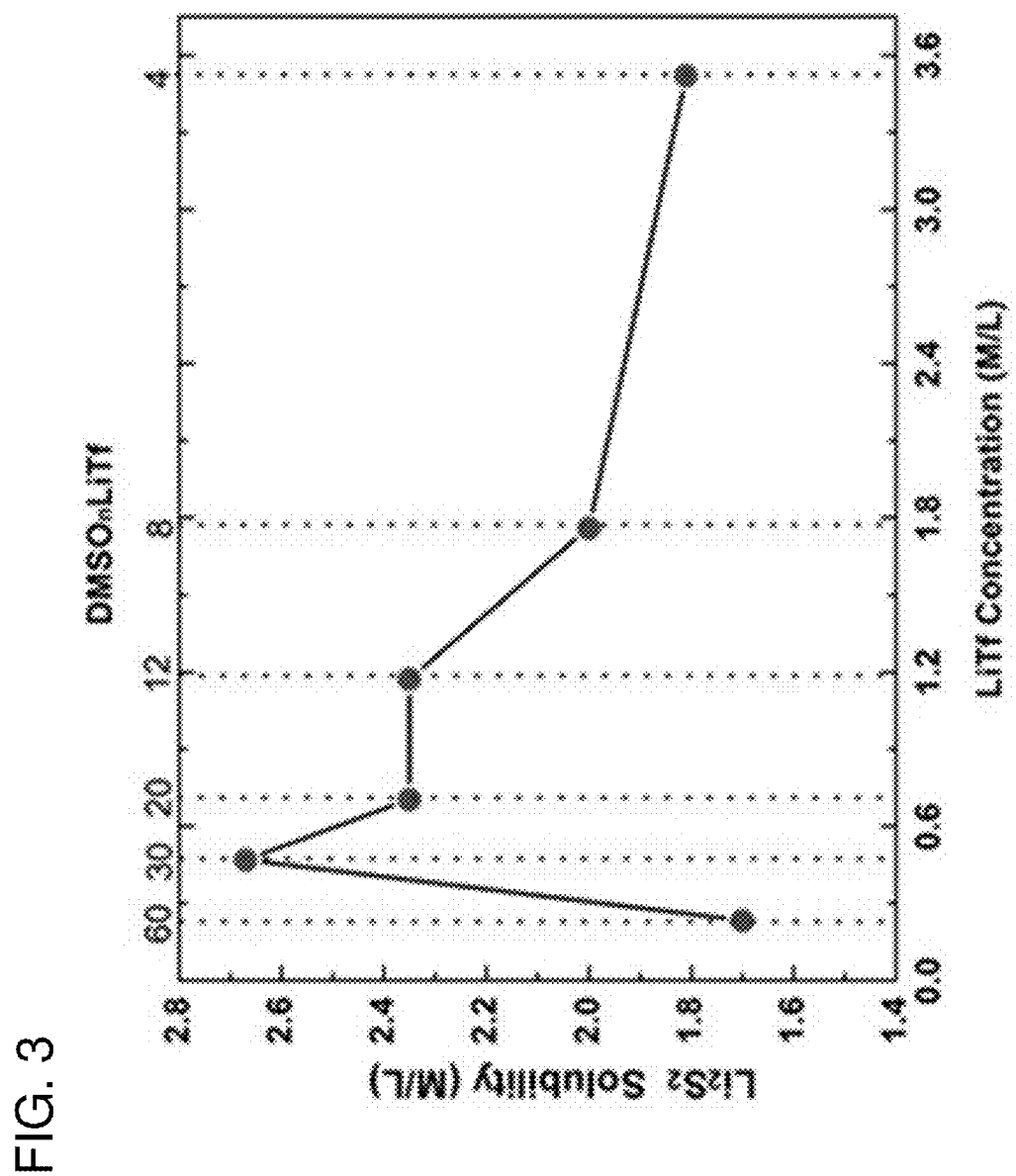
FIG. 3 is a graph demonstrating the effect of LiTf on increasing the solubility of $Li_2S_2$ in DMSO solvent.
Figure 4:
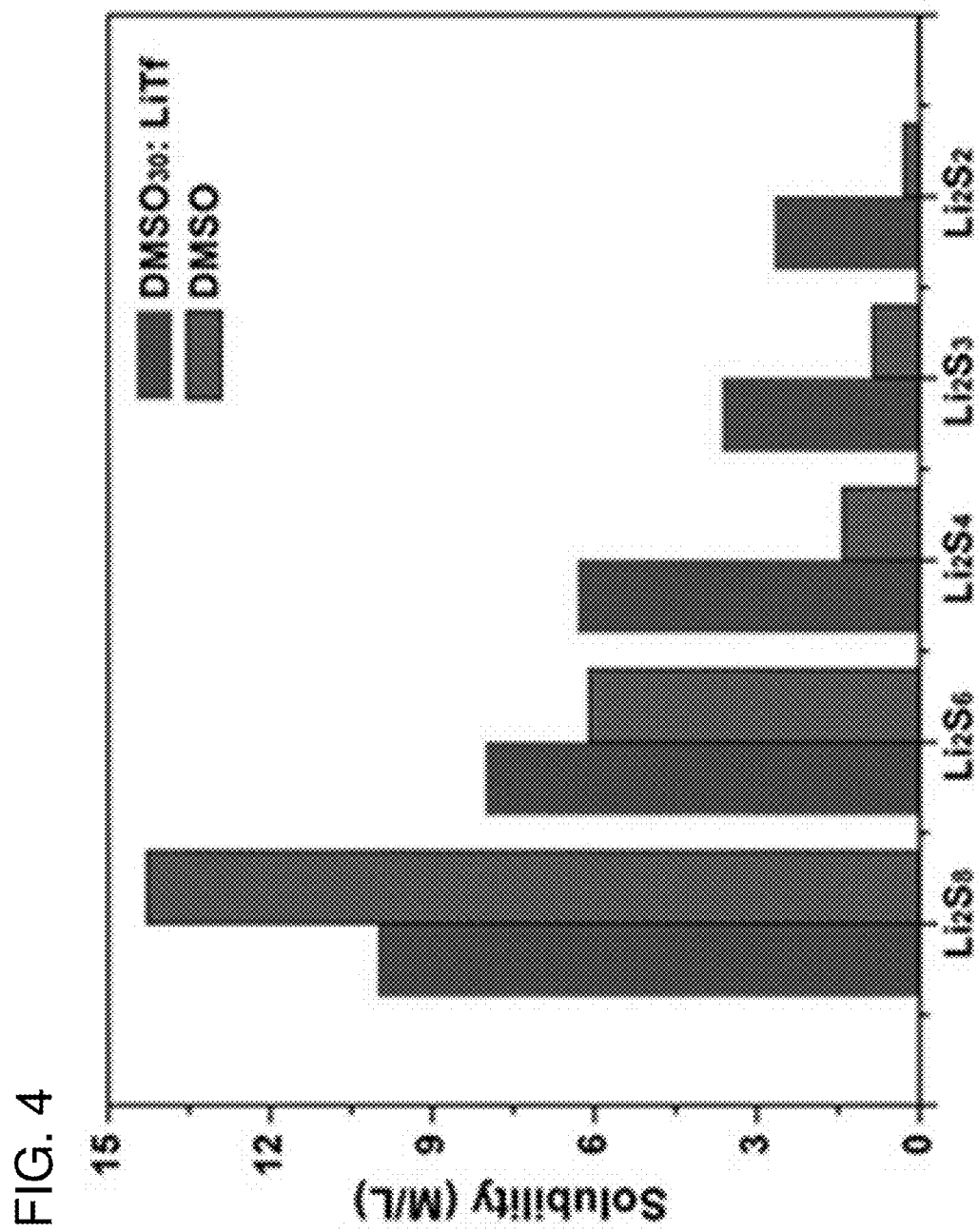
FIG. 4 is a graph demonstrating the solubility of $Li_2S_x$ in $DMSO_{30}$:LiTf mixture.

Lithium trifluoromethanesulfonate (LiTf) comprised of IT anion with high ionic association, was used as an additive to enhance the solubility of low order $Li_2S_x$ in DMSO solvent. FIG. 3 shows the effect of LiTf addition on increasing solubility for insoluble $Li_2S_2$ at different LiTf concentrations in DMSO solvent. For salt/solvent mole ratio of 30 ($DMSO_{30}$:LiTf), the solubility of $Li_2S_2$ can be increased almost ten times higher than that in pure DMSO solvent. The solubility of other polysulfides with different chain lengths is also improved after the addition of LiTf (FIG. 4).

Figures 5, 5A, 5B:
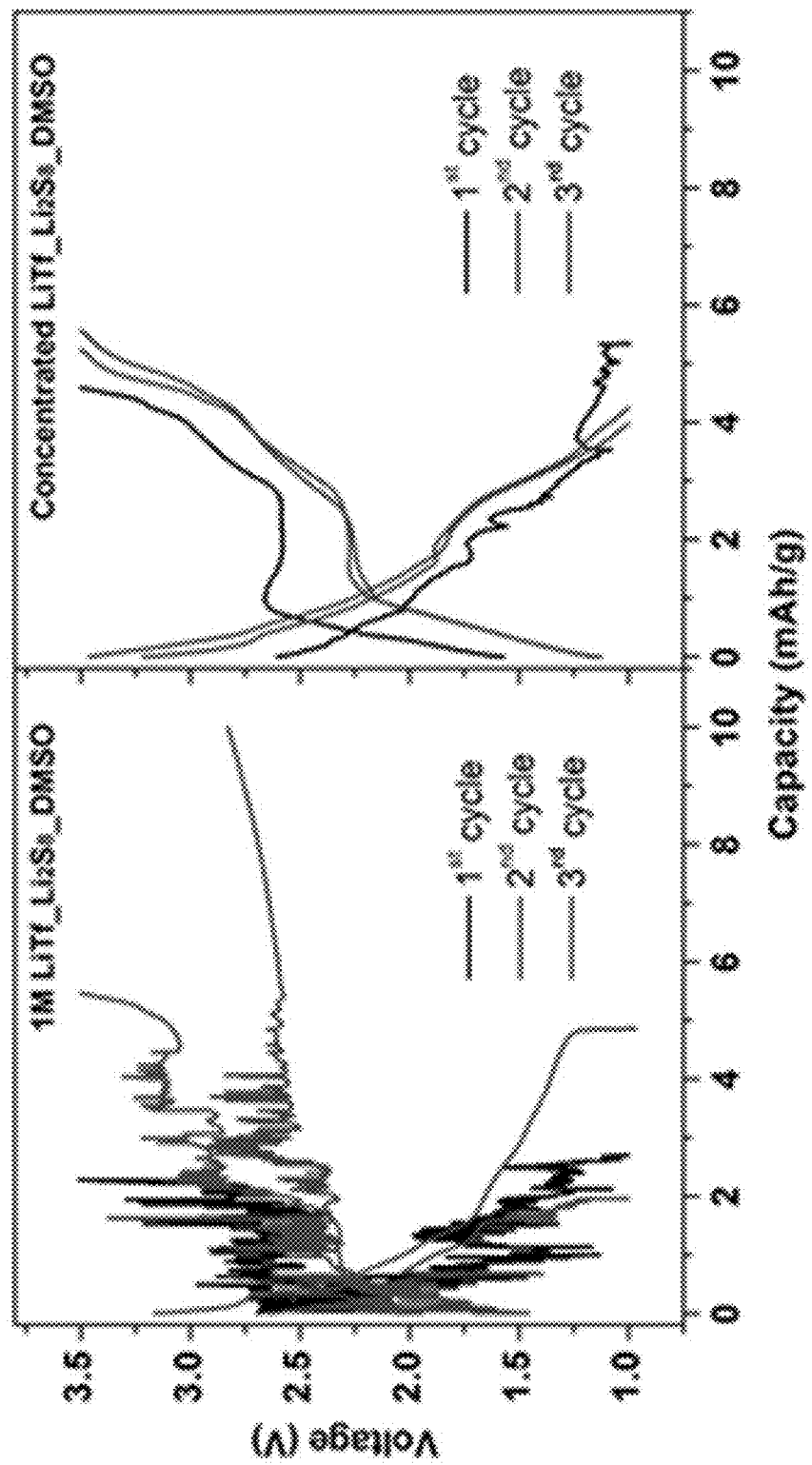
FIGS. 5a and 5b show the charge/discharge curves in Li—S batteries in (a) 1M and (b) concentrated (2 M) electrolyte consisting of LiTf in DMSO solvent.
Figure 6:
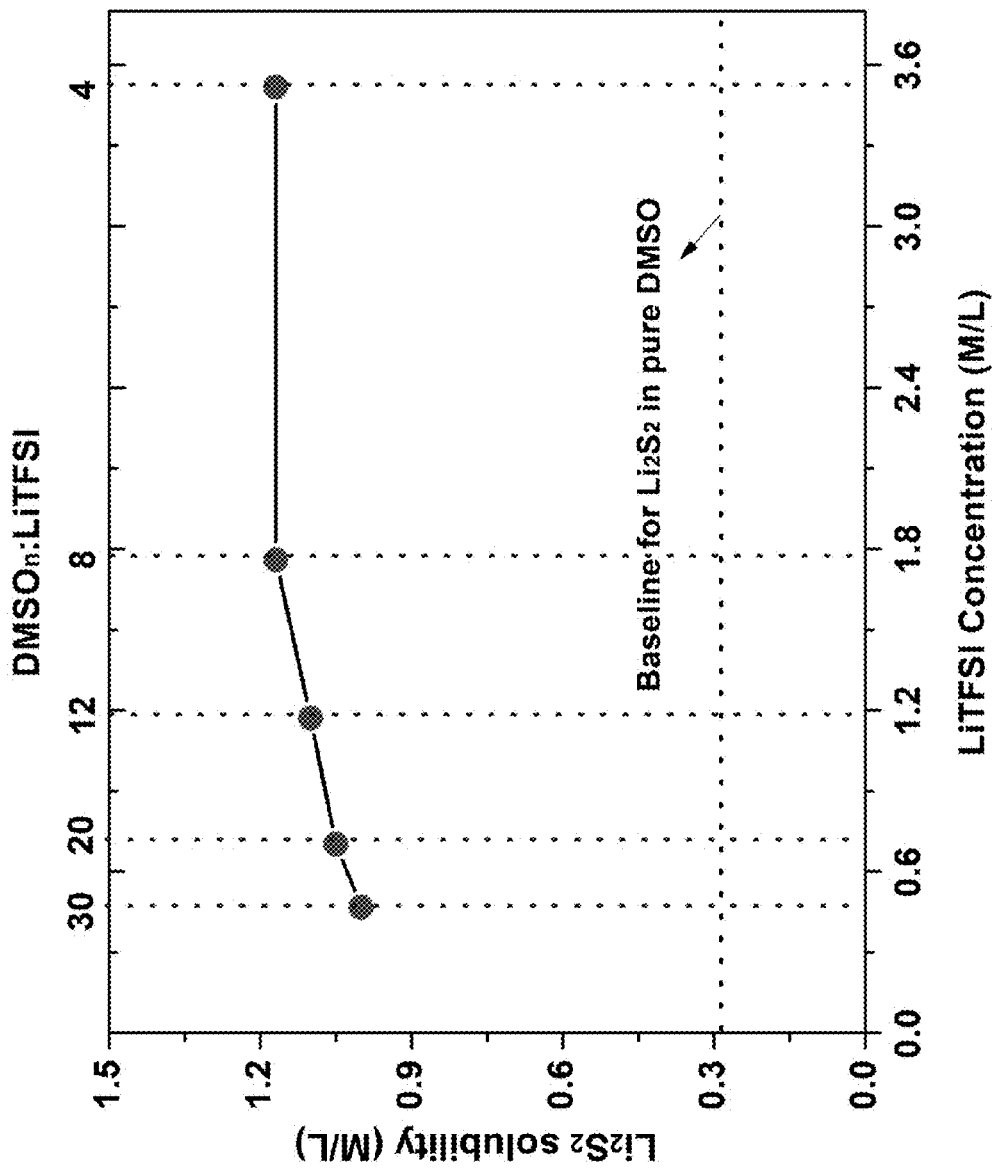
FIG. 6 is a graph showing the effect of LiTFSI on increasing the solubility of $Li_2S_2$ in DMSO solvent.
Figures 7, 7A, 7B:
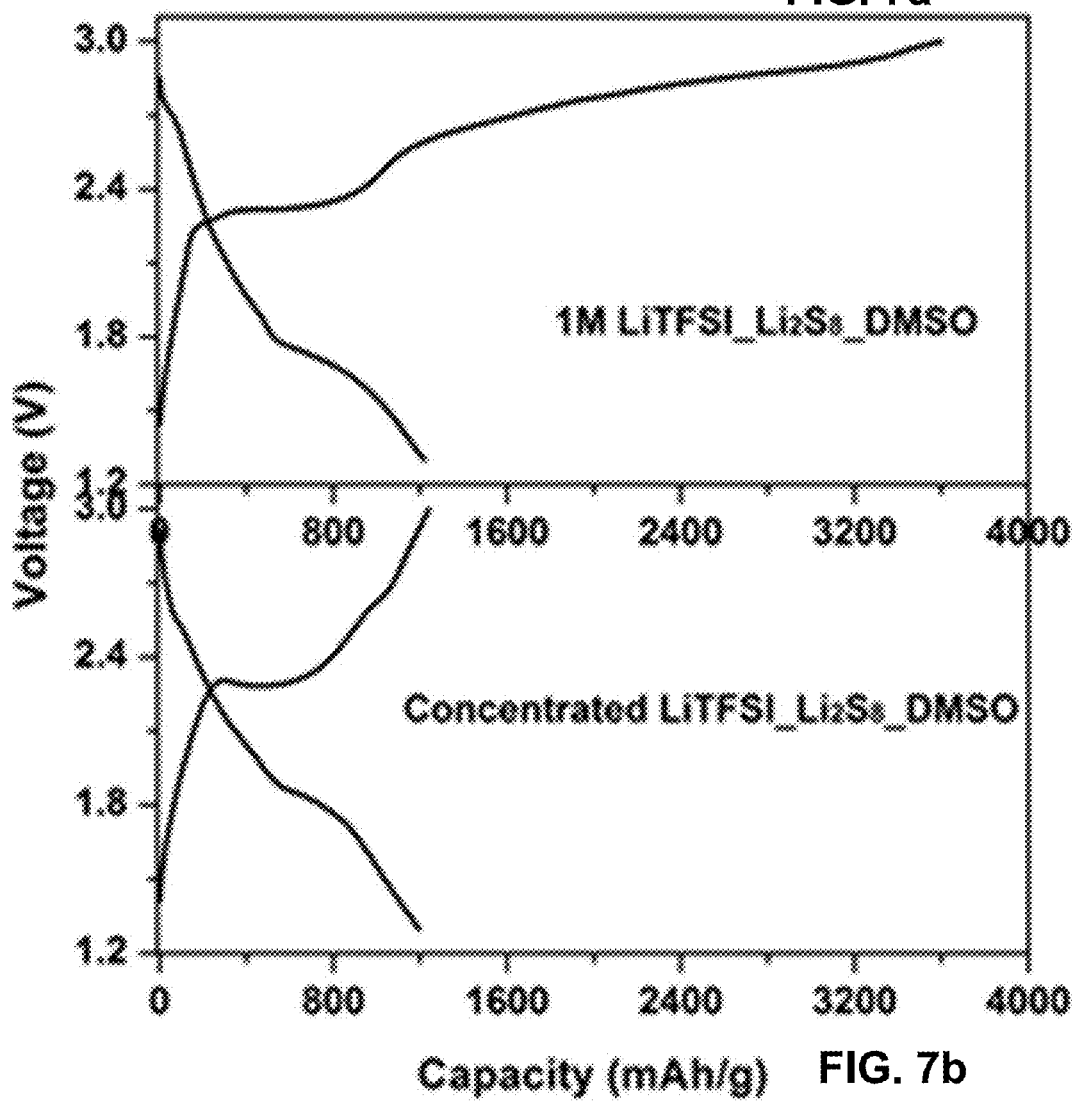
FIGS. 7a and 7b shows the charge/discharge curves of Li—S batteries using (a) 1M and (b) concentrated (3 M) electrolyte comprised of LiTFSI in DMSO. (Note: the S cathode used here was dissolved into DMSO electrolyte in the form of $Li_2S_x$).

Concentrated salt electrolyte is employed to improve the capability of Li anode with DMSO-based electrolyte. When 1M LiTf in DMSO is used in a Li—S battery, the charge-discharge curves show large fluctuations (FIG. 5a) due to the unstable interface between DMSO and lithium metal. When LiTf concentration is increased to more than 1M, the curves in FIG. 5b became smoother. It was found that if LiTf was replaced by LiTFSI, similar increased solubility of short-chain polysulfides can be reached (FIG. 6). Again, 1M LiTFSI in DMSO has abnormally long charge plateau due to the instability of Li metal in DMSO (FIG. 7a). Increasing LiTFSI concentration effectively prevents the parasitic reactions during charge (FIG. 7b). Significantly improved cycling stability (FIG. 8a) and Columbic efficiency (FIG. 8b) are observed in concentrated LiTFSI electrolytes with high reversible capacity at ca.1000-1200 mAh/g. These examples were performed with stationary button cells, with carbon sheet as cathode current collector, dissolved $Li_2S_x$ in DMSO-based solvent as catholyte, and Li counter and reference electrodes.

In view of the many possible embodiments to which the principles of the disclosed systems, devices and compositions may be applied, it should be recognized that the illustrated embodiments are only preferred examples of the invention and should not be taken as limiting the scope of the invention.

What is claimed is:
1. A device comprising:
   a non-aqueous lithium sulfur redox flow battery comprising an electrolyte composition comprising:

(i) a dissolved $Li_2S_x$ electroactive salt, wherein $x \geq 4$;
(ii) a solvent selected from dimethyl sulfoxide, tetrahydrofuran, or a mixture thereof; and
(iii) a supporting salt at a concentration of at least 3 M, as measured by moles of supporting salt divided by the volume of the solvent without considering the volume change of the electrolyte after dissolving the supporting salt.

2. The device of claim 1, wherein the electroactive salt is $Li_2S_8$.

3. The device of claim 1 or 2, wherein the solvent consists essentially of dimethyl sulfoxide.

4. The device of claim 1 or 2, wherein the solvent consists of dimethyl sulfoxide.

5. The device of claim 1, wherein the supporting salt is selected from lithium trifluoromethanesulfonate, lithium bis(trifluoromethanesulphonyl) imide, $LiCF_2CO_2$, $LiNO_3$, or a mixture thereof.

6. The device of claim 5, wherein the supporting salt is selected from lithium trifluoromethanesulfonate, or lithium bis(trifluoromethanesulphonyl) imide.

7. The device of claim 1, further comprising a lithium metal anode.

8. The device of claim 1, wherein the electrolyte composition is a catholyte.

9. The device of claim 1, further comprising:
a first half cell part comprising a current collector and the electrolyte composition, wherein the electrolyte composition is a catholyte; and
a second half cell part comprising a lithium metal anode.

10. The device of claim 9, wherein the current collector comprises carbon felt.

11. The device of claim 1, wherein the supporting salt is lithium bis(trifluoromethanesulphonyl) imide at a concentration of 3M to 4M.

12. The device of claim 11, wherein the solvent consists essentially of dimethyl sulfoxide.

13. The device of claim 1, wherein the electroactive salt is $Li_2S_8$, the solvent consists essentially of dimethyl sulfoxide, and the supporting salt is lithium bis(trifluoromethanesulphonyl) imide at a concentration of 3M to 4M.

14. An energy storage system comprising:
a non-aqueous lithium sulfur redox flow battery comprising an electrolyte composition comprising:
(i) a dissolved $Li_2S_x$ electroactive salt, wherein $x \geq 4$;
(ii) a solvent selected from dimethyl sulfoxide, tetrahydrofuran, or a mixture thereof; and
(iii) a supporting salt at a concentration of at least 3 M, as measured by moles of supporting salt divided by the volume of the solvent without considering the volume change of the electrolyte after dissolving the supporting salt; and
a source of the electrolyte composition fluidly coupled to the lithium sulfur redox flow battery.

15. The system of claim 14, wherein the lithium sulfur redox flow battery comprises: a first half cell part comprising a current collector and the electrolyte composition, wherein the electrolyte composition is a catholyte; and
a second half cell part comprising a lithium metal anode;
wherein the source of the electrolyte composition is fluidly coupled to the first half cell part.

16. A method of charging and discharging a non-aqueous lithium sulfur redox flow battery through multiple cycles wherein, prior to discharging, the battery comprises an electrolyte composition comprising:
(i) a dissolved $Li_2S_x$ electroactive salt, wherein $x \geq 4$;
(ii) a solvent selected from dimethyl sulfoxide, tetrahydrofuran, or a mixture thereof; and
(iii) a supporting salt at a concentration of at least 3 M, as measured by moles of supporting salt divided by the volume of the solvent without considering the volume change of the electrolyte after dissolving the supporting salt; and
during discharging $S_x^{2-}$ species are reduced to $S_2^{2-}$, $S^{2-}$ species, or a mixture of $S_2^{2-}$ and $S^{2-}$ species.

17. A method of charging and discharging a non-aqueous lithium sulfur redox flow battery through multiple cycles wherein, prior to discharging, the battery comprises an electrolyte composition comprising:
(i) a dissolved $Li_2S_x$ electroactive salt, wherein $x \geq 4$;
(ii) a solvent consisting of dimethyl sulfoxide; and
(iii) a supporting salt at a concentration of at least 3 M, as measured by moles of supporting salt divided by the volume of the solvent without considering the volume change of the electrolyte after dissolving the supporting salt; and
during discharging $S_x^{2-}$ species are reduced to $S_2^{2-}$, $S^{2-}$ species, or a mixture of $S_2^{2-}$ and $S^{2-}$ species.

* * * * *